US011021885B2

(12) United States Patent
Williams

(10) Patent No.: US 11,021,885 B2
(45) Date of Patent: Jun. 1, 2021

(54) SYSTEM AND METHOD FOR FINDING DENTS ON AN AUTOMOBILE USING A BOOTH

(71) Applicant: Thomas Williams, Montgomery, TX (US)

(72) Inventor: Thomas Williams, Montgomery, TX (US)

(*) Notice: Subject to any disclaimer, the term of this patent is extended or adjusted under 35 U.S.C. 154(b) by 0 days.

(21) Appl. No.: 16/893,069

(22) Filed: Jun. 4, 2020

(65) Prior Publication Data

US 2020/0299984 A1      Sep. 24, 2020

Related U.S. Application Data

(63) Continuation-in-part of application No. 15/398,056, filed on Jan. 4, 2017.

(51) Int. Cl.
| | | |
|---|---|---|
| *E04H 15/20* | (2006.01) | |
| *B60S 5/00* | (2006.01) | |
| *E04H 1/12* | (2006.01) | |
| *E04H 6/02* | (2006.01) | |
| *G01N 21/956* | (2006.01) | |

(Continued)

(52) U.S. Cl.
CPC ............ *E04H 1/1205* (2013.01); *B60S 5/00* (2013.01); *E04H 6/025* (2013.01); *E04H 15/20* (2013.01); *E04H 2015/201* (2013.01); *G01B 11/30* (2013.01); *G01N 21/8851* (2013.01); *G01N 21/956* (2013.01)

(58) Field of Classification Search
CPC . G06Q 40/08; B60P 3/14; B60P 3/025; B60P 3/12; B60P 3/122; G01N 21/956; G01N 21/8851; G01B 11/30; G06T 5/50; G06T 7/0004; G02B 26/02; E04H 1/1205; E04H 15/20; E04H 6/025; E04H 2015/201; B60S 5/00
See application file for complete search history.

(56) References Cited

U.S. PATENT DOCUMENTS 2,955,606 A * 10/1960 Walker .................... E04H 15/20
                                                      52/2.21
3,170,384 A *  2/1965 Evert ...................... B05B 14/46
                                                      454/54

(Continued)

FOREIGN PATENT DOCUMENTS

| DE | 202004014281 | 2/2005 |
|---|---|---|
| DE | 102010015566 | 10/2011 |
| WO | 2009083251 | 7/2009 |

*Primary Examiner* — Phi D A
(74) *Attorney, Agent, or Firm* — Bushman Werner, P.C.

(57) ABSTRACT

An inflatable booth for use in detecting dents on an automobile. The inflatable booth generally forms an archway or tunnel and has an exterior surface and an interior surface. Lights are mounted on the exterior surface of the booth. The exterior surface of the booth is transparent or clear at least in the areas where the lights are positioned. The interior surface has a repeating geometric pattern. To detect dents, an automobile is driven into the booth and the lights are turned on. The geometric pattern on the interior surface of the booth is reflected off the surface of the automobile forming a reflected pattern. Dents or mars in the surface of the automobile cause distortions in the reflected pattern, thus making them easy to detect and fix. The booth can be easily inflated, deflated, and transported.

12 Claims, 3 Drawing Sheets

(51) Int. Cl.
*G01N 21/88* (2006.01)
*G01B 11/30* (2006.01)

(56) References Cited

U.S. PATENT DOCUMENTS

| | | | | |
|---|---|---|---|---|
| 3,388,509 A * | 6/1968 | Mora | ............ | E04B 1/168 52/2.15 |
| 4,231,289 A * | 11/1980 | Domicent | ............ | B05B 16/40 454/52 |
| 4,384,435 A * | 5/1983 | Polise | ............ | E04H 15/20 52/2.19 |
| 4,416,068 A * | 11/1983 | Nilsson | ............ | B05D 3/0263 118/642 |
| 4,736,762 A * | 4/1988 | Wayman | ............ | A61G 10/005 128/205.26 |
| 5,042,420 A * | 8/1991 | Gerdes | ............ | B05B 16/40 118/50.1 |
| 5,107,637 A * | 4/1992 | Robbins | ............ | G09F 13/04 52/28 |
| 5,436,726 A * | 7/1995 | Ventura | ............ | G01B 11/25 356/237.2 |
| 5,570,544 A * | 11/1996 | Hale | ............ | E04H 15/20 52/2.11 |
| 5,636,024 A | 6/1997 | Crookham et al. | | |
| 5,726,705 A * | 3/1998 | Imanishi | ............ | G01N 21/8806 348/92 |
| 5,911,500 A * | 6/1999 | Barnett | ............ | G01N 21/8806 362/145 |
| 6,382,825 B1 * | 5/2002 | Wainwright | ............ | E04H 15/10 362/145 |
| 8,615,966 B2 * | 12/2013 | Thompson | ............ | A63H 33/008 52/745.19 |
| 9,509,960 B2 | 11/2016 | Mirza et al. | | |
| 10,704,289 B1 * | 7/2020 | Poulin | ............ | E04H 15/20 |
| 2005/0223653 A1 | 10/2005 | Mower et al. | | |
| 2006/0114531 A1* | 6/2006 | Webb | ............ | G01N 21/8851 359/15 |
| 2009/0249701 A1* | 10/2009 | Turcot | ............ | E04H 15/20 52/2.18 |
| 2010/0272915 A1* | 10/2010 | Laws | ............ | B05B 16/40 427/421.1 |
| 2015/0017338 A1 | 1/2015 | Wiliams | | |
| 2015/0040487 A1 | 2/2015 | Wiliams | | |
| 2018/0160019 A1* | 6/2018 | Scheich | ............ | H04N 5/232 |

* cited by examiner

SYSTEM AND METHOD FOR FINDING DENTS ON AN AUTOMOBILE USING A BOOTH

CROSS REFERENCE TO RELATED APPLICATION

This application is a continuation-in-part of U.S. application Ser. No. 15/398,056 filed on Jan. 4, 2017, the disclosure of which is incorporated herein by reference for all purposes.

FIELD OF THE INVENTION

The present invention relates to an inflatable booth which can be used to detect dents in an automobile. More particularly, the present invention relates to a booth having a transparent exterior surface, and a patterned interior surface, with illumination sources removably attached to the exterior.

BACKGROUND OF THE INVENTION

Hail and other impacts can leave dents and creases on the body of an automobile. Such minor damages can ruin the aesthetics of the automobile. Methods for removing dents on the body of an automobile have evolved over the years. One of the methods for repairing dents is known as paintless dent repair (PDR). In this method, it is significant to be able to located the position of the dents precisely. As such, technicians need to use PDR reading instruments such as paintless dent repair lights, reflection boards, fluorescent, or light-emitting diode (LED) lighting to properly assess and located the dents. This method can be effective in locating and assessing the dent but is limited to small areas of the automobile. Thus, such methods of locating dents can be time-consuming, inconvenient and expensive.

As such, it would be useful to have a system and method for finding dents on an automobile using a drive through booth, dedicated to the purpose and which can reveal dents along the entire body of the automobile.

SUMMARY OF THE INVENTION

In one aspect, the present invention relates to an inflatable booth having an patterned interior surface which can be used to detect dents in the surface of a vehicle.

In another aspect, the present invention relates to an inflatable booth having an patterned interior surface, and a transparent exterior surface. Lights are removably attached to the exterior surface and illuminate the booth to detect dents in the surface of a vehicle parked inside the booth.

In yet another aspect, the present invention relates to a method for detecting dents in a vehicle using an inflatable booth as described above.

These and further features and advantages of the present invention will become apparent from the following detailed description, wherein reference is made to the figures in the accompanying drawings.

DETAILED DESCRIPTION OF PREFERRED EMBODIMENTS

Figure 1:
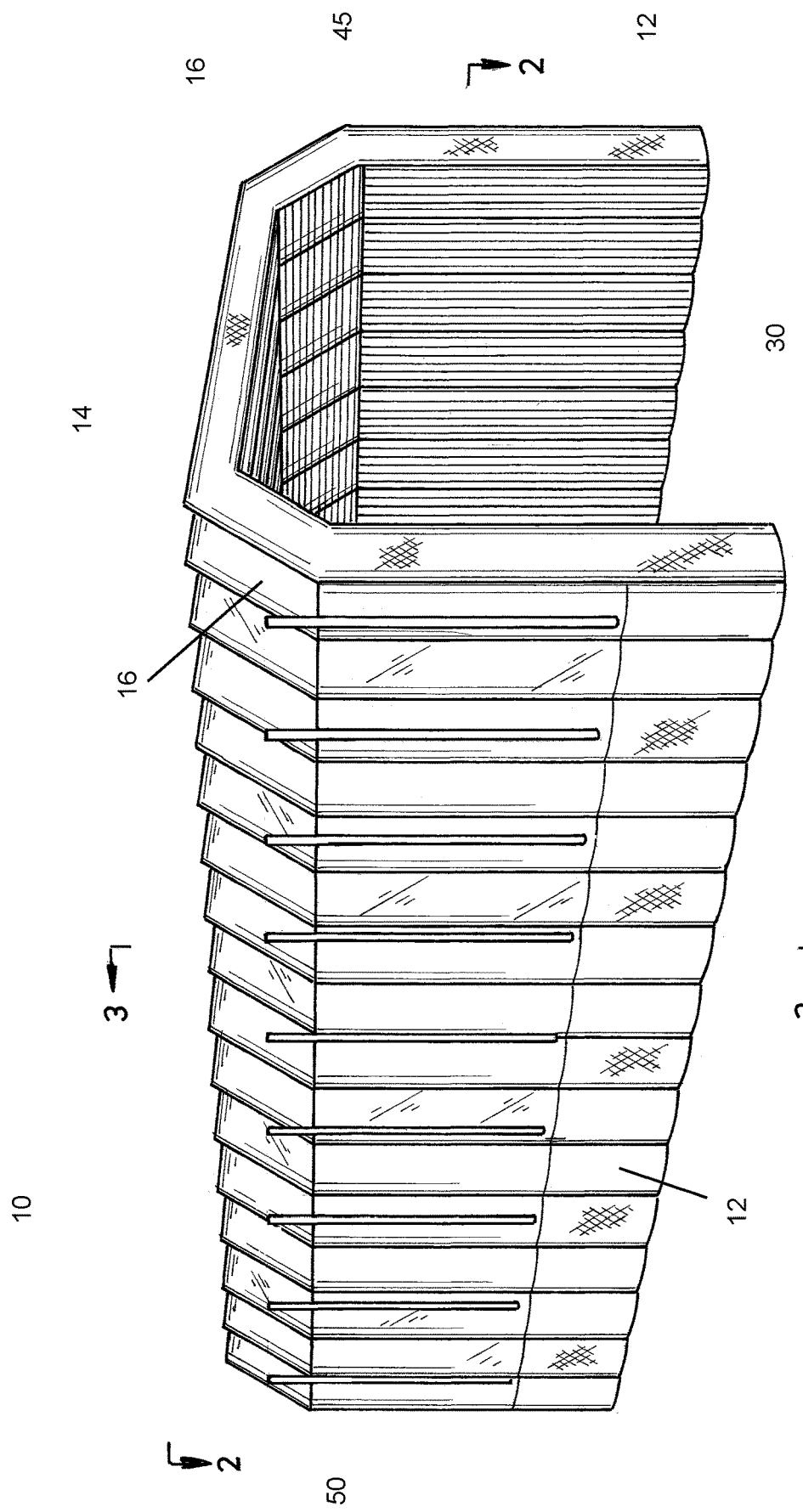
FIG. 1 is an isometric view of one embodiment of the inflatable booth of the present invention.
Figure 2:
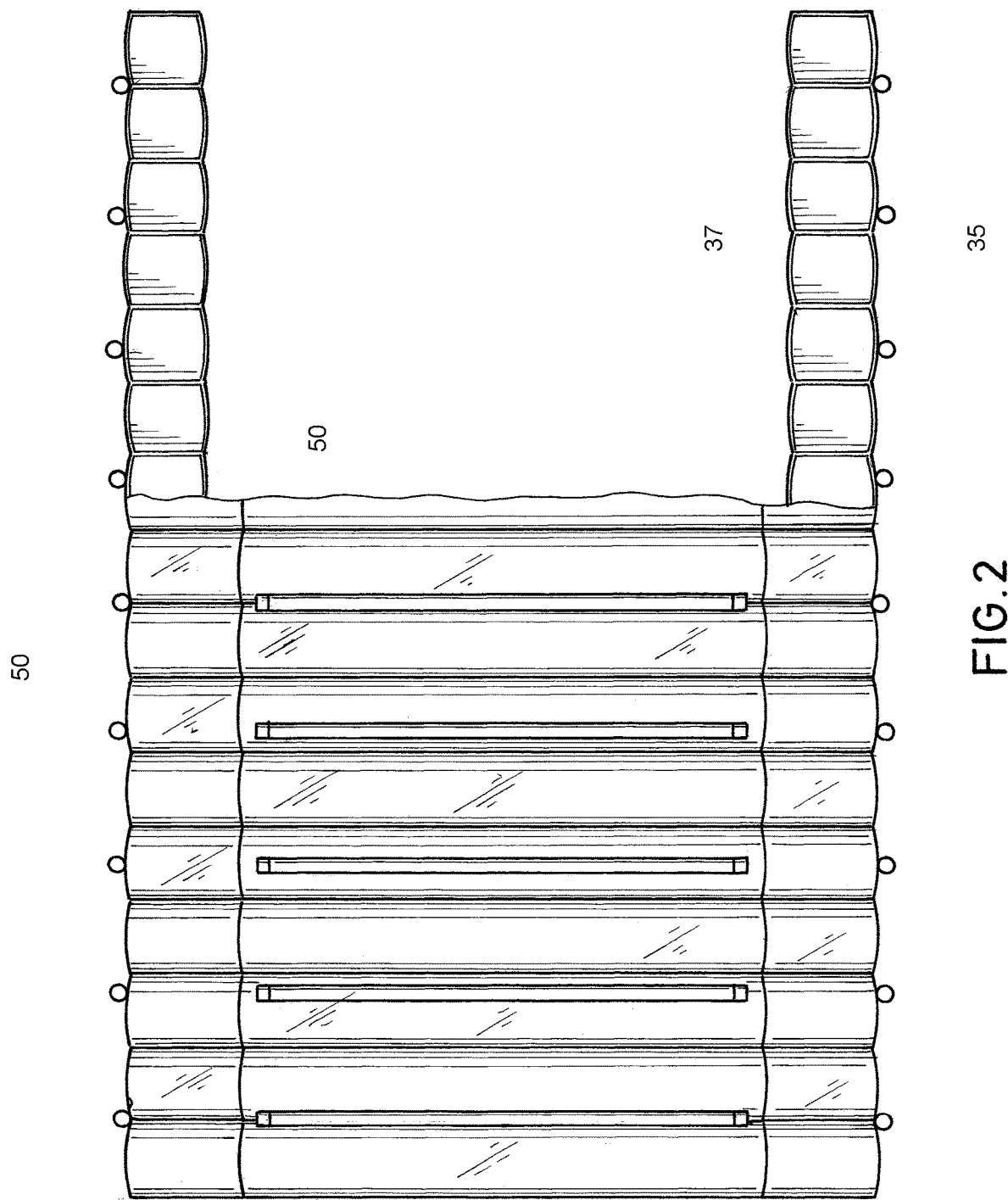
FIG. 2 is a view, partly in section, taken along the lines 2-2 of FIG. 1.
Figure 3:
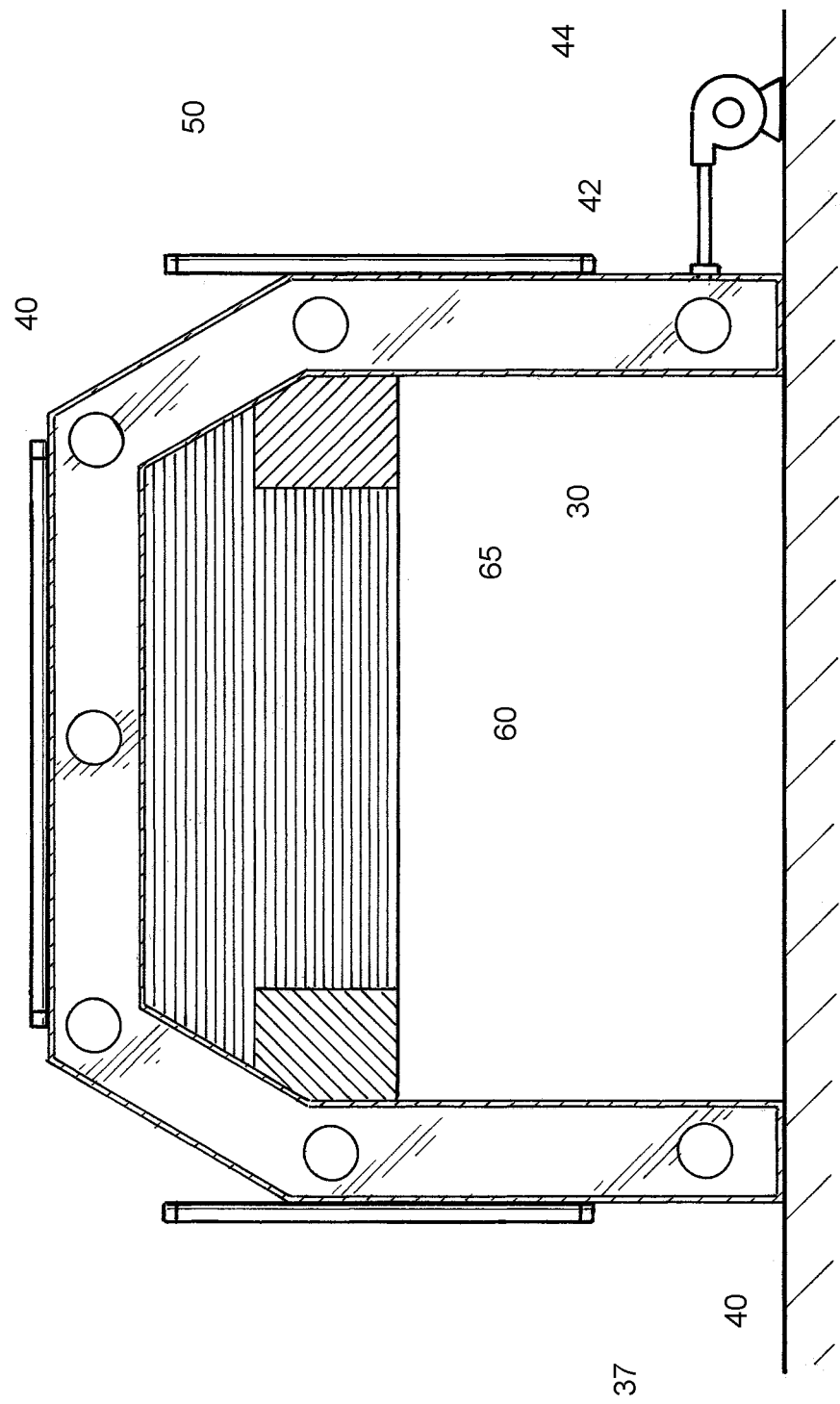
FIG. 3 is a cross-sectional view taken along the lines 3-3 of FIG. 1.

FIG. 1 shows one embodiment of the inflatable booth, shown generally as 10, of the present invention. Inflatable booth 10 forms a generally U-shaped archway or tunnel, having walls 12, ceiling 14, and corners 16. Inflatable booth 10 should be large enough for a vehicle to drive through it, and leave room for one or more technicians to work on any dents. Booth 10 has an exterior surface 20 and an interior surface 30. As can best be seen in FIGS. 2 and 3, the shape of booth 10 is achieved by a series of connected inflatable tubes 35. Tubes 35 are formed by internal walls 37 which connect exterior surface 20 and interior surface 30. One or more openings 40 in the walls 37 allow air to flow between tubes 35, such that booth 10 can be fully inflated from a single inflation port. It will be appreciated that openings 40 between tubes 35 can be positioned in any location such that air can flow freely between tubes 35 and thereby inflate booth 10. For example, openings 40 may not be openings within walls 37, but rather gaps in which there is no wall 37, e.g., if walls 37 do not extend all the way to the lower ends of tubes 35. In any event, it is preferred that booth 10 be inflatable from one or two inflation ports, without having to inflate each tube 35 separately. As shown in FIG. 3, booth 10 is inflatable from inflation port 42 using pump 44.

For reasons explained more fully hereafter, in a preferred embodiment, exterior surface 20 of inflatable booth 10 is transparent or clear, at least in the areas where lights 50 are located. Interior surface 30 is covered in a repeating geometric pattern of light and dark colors, shown generally as 45. Geometric pattern 45 preferably comprises a series of straight parallel stripes, more preferably black and white stripes. It will be understood that geometric pattern 45 does not need to be consistent throughout booth 10. In a preferred embodiment, and as seen in FIG. 1, the directions of the stripes vary between walls 12 and corners 16, preferably running perpendicular to one another. Geometric pattern 45 can also vary by using lines of differing thickness. Geometric pattern 45 can be created in differing ways. For example, geometric pattern 45 can painted on to the interior surface 30, it can be generated using tape or other adhesive material which will remain in place on interior surface 30, or, in a preferred embodiment, it can be built in to interior surface 30 during production of the booth.

A plurality of light sources 50 are removably attached to exterior surface 20, preferably along both walls 12 and the ceiling 14. It will be understood that power cords and connections can run between the lights in a manner well known to those skilled in the art. Lights 50 can be held in place by various means, including but not limited to, straps which are affixed to exterior surface 20 and which wrap around the lights, pockets or pouches along exterior surface 20 in which the lights can rest, hook-and-loop fabric affixed to the lights and to exterior surface 20. In any event, it is preferred that lights 50 are removable so booth 10 can be deflated and stored when not in use. Lights 50 can be fluorescent lights, light emitting diodes (LEDs), or other lights which are easily attached to and removed from booth 10. In a preferred embodiment, lights 50 are LED tube lights. Power cords, straps, pouches, and the like are not depicted in the drawings but would be well understood by those of skill in the art.

In a preferred embodiment, inflatable booth 10 includes at least one non-inflatable end wall which at least partially closes off an end of the tunnel. As seen in FIG. 3, end wall 60 is attached to the outer end of tunnel 10. In a preferred embodiment, end wall 60 is removably attached by means well known to those in the art, e.g., hook and loop fabric, temporary adhesive, clips, buttons, snaps, etc. End wall 60 has at least one repeating geometric pattern 65 which faces the interior of booth 10. It will be understood that end wall 60 can extend partially down the booth, as depicted in FIG. 3, or all the way to the ground. If desired, two end walls 60 can be used, one on each end, to form a more fully enclosed booth around a vehicle. In such case, one end would be affixed only after the vehicle was driven into the booth, and one end would removed before the vehicle is driven out of the booth. Alternatively, end walls 60 can be permanently affixed but include slits or openings such that they can be pulled aside to allow a vehicle to enter/exit booth 10.

Booth 10 can be made of material suitable for inflating. The material must be durable enough to withstand the air pressure of inflation and support the lights mounted on exterior surface 20. For example, booth 10 can be made of durable sheet material such as plastic or fabric, including, but not limited to vinyl, polyethylene, polyvinyl chloride, or oxford nylon. In a preferred embodiment, the booth is made of a vinyl material. End wall 60 can be made of the same material as booth 10 or different material.

In using the booth, a vehicle is driven into the booth. The lights 50 are turned on. The light shines through the transparent or clear material of exterior surface 20 and illuminates interior surface 30. The light causes geometric pattern 45 to reflect off the surface of the vehicle. The reflected pattern appears substantially similar to the geometric pattern 45, except in locations in which there is a dent or mar in the paint of vehicle 5. The dent causes the reflected pattern to distort, rendering the dent easy to locate. The technicians can then repair the dent and use the reflected pattern to check the quality of the repair work. A well-repaired dent should generate little to no distortion in the reflected pattern.

Because booth 10 is inflatable, it can easily be installed and taken down at various locations. If needed, ropes can be used to anchor the booth down in a windy area. The easy installation and take down of the booth, as well as its portability when deflated allows for more flexibility when working on vehicles. The booth can be brought to the vehicle, rather than the other way around. Prior art booths which are not inflatable and which employ complex mechanics and scanning systems, must be permanently set up and cannot be readily taken down and moved. Other systems, such as portable reflection boards, do not show the entire vehicle and must be moved around from location to location, thus increasing the chances that a dent will be overlooked. The present invention provides a simple, easily installed, easily transportable means for detecting dents anywhere on the surface of a vehicle.

Although specific embodiments of the invention have been described herein in some detail, this has been done solely for the purposes of explaining the various aspects of the invention, and is not intended to limit the scope of the invention as defined in the claims which follow. Those skilled in the art will understand that the embodiment shown and described is exemplary, and various other substitutions, alterations and modifications, including but not limited to those design alternatives specifically discussed herein, may be made in the practice of the invention without departing from its scope.

What is claimed is:

1. An inflatable booth for detecting dents in the surface of an automobile parked within said inflatable booth, the inflatable booth comprising:
    an inflatable tunnel or archway comprising inflatable walls and an inflatable ceiling, said tunnel having an interior surface and an exterior surface;
    at least one light removably mounted on said exterior surface of said inflatable tunnel;
    a repeating geometric pattern of light and dark colors formed on said interior surface of said tunnel, said repeating geometric pattern being reflectable off a surface of said parked automobile when said inflatable booth is illuminated, such that the presence of defects can be detected using a reflected pattern, said reflected pattern being a reflected image of said repeating geometric pattern on said parked automobile.

2. The inflatable booth of claim 1, wherein said exterior surface is made at least partially of transparent or clear material.

3. The inflatable booth of claim 1, wherein a plurality of lights are removably mounted on said exterior surface of said inflatable booth.

4. The inflatable booth of claim 3, wherein said plurality of lights are mounted on said walls and said ceiling of said tunnel.

5. The inflatable booth of claim 1, wherein said repeating geometric pattern comprises parallel lines.

6. The inflatable booth of claim 1, further comprising an end wall removably mounted on an end of said tunnel, said end wall having a repeating geometric pattern facing into said tunnel.

7. A method for detecting dents in an automobile, comprising:
    providing an inflatable booth comprising:
        an inflatable tunnel or archway comprising inflatable walls and an inflatable ceiling, said tunnel having an interior surface and an exterior surface;
        at least one light removably mounted on said exterior surface of said inflatable tunnel;
        a repeating geometric pattern of light and dark colors formed on said interior surface of said tunnel, said repeating geometric pattern being reflectable off a surface of said parked automobile when said inflatable booth is illuminated, such that the presence of defects can be detected using a reflected pattern, said reflected pattern being a reflected image of said repeating geometric pattern on said parked automobile;
    driving an automobile into said inflatable booth and parking said automobile in said booth;
    turning on said at least one light such to cause said repeating geometric pattern to reflect off the paint of said parked automobile creating a reflected pattern;
    studying said reflected pattern to look for distortions which indicate a dent or mar in the paint of said parked automobile.

8. The method of claim 7, further comprising:
    repairing any dents or mars found in the paint of said automobile;
    studying said reflected pattern again to check whether said dent or mar has been fully repaired.

9. The method of claim 7, wherein said exterior surface is made at least partially of transparent or clear material.

10. The method of claim 7, wherein a plurality of lights are removably mounted on said exterior surface of said inflatable booth.

11. The method of 10, wherein said plurality of lights are mounted on said walls and said ceiling of said tunnel.

12. The method of claim 7, wherein said repeating geometric pattern comprises parallel lines.

\* \* \* \* \*